J. A. HOCKETT.
HORSE RELEASER.
APPLICATION FILED FEB. 9, 1909.
936,128.
Patented Oct. 5, 1909.
2 SHEETS—SHEET 2.
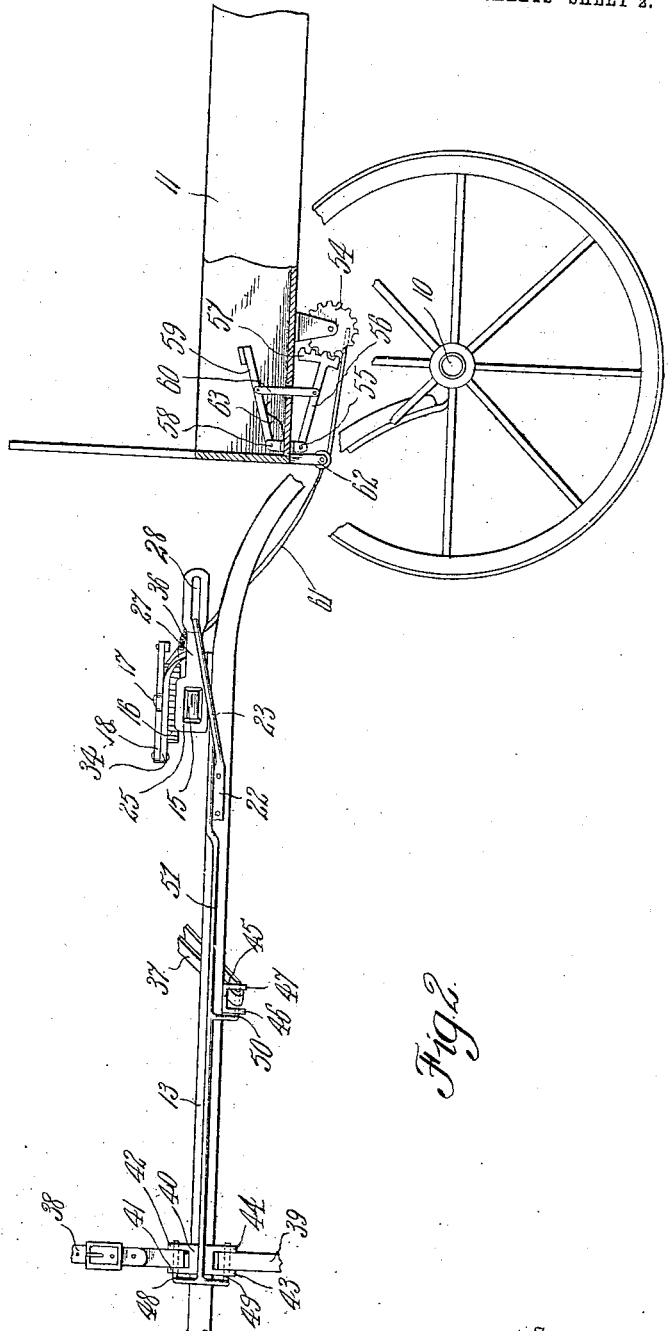
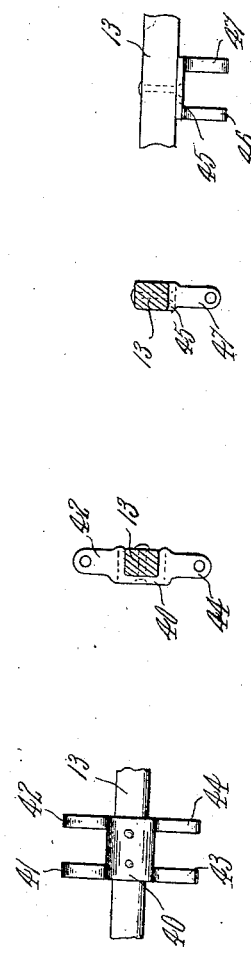
Witnesses
J. H. Crawford
C. N. Woodward
Inventor
Jesse A. Hockett,
By Chandler & Chandler
Attorneys

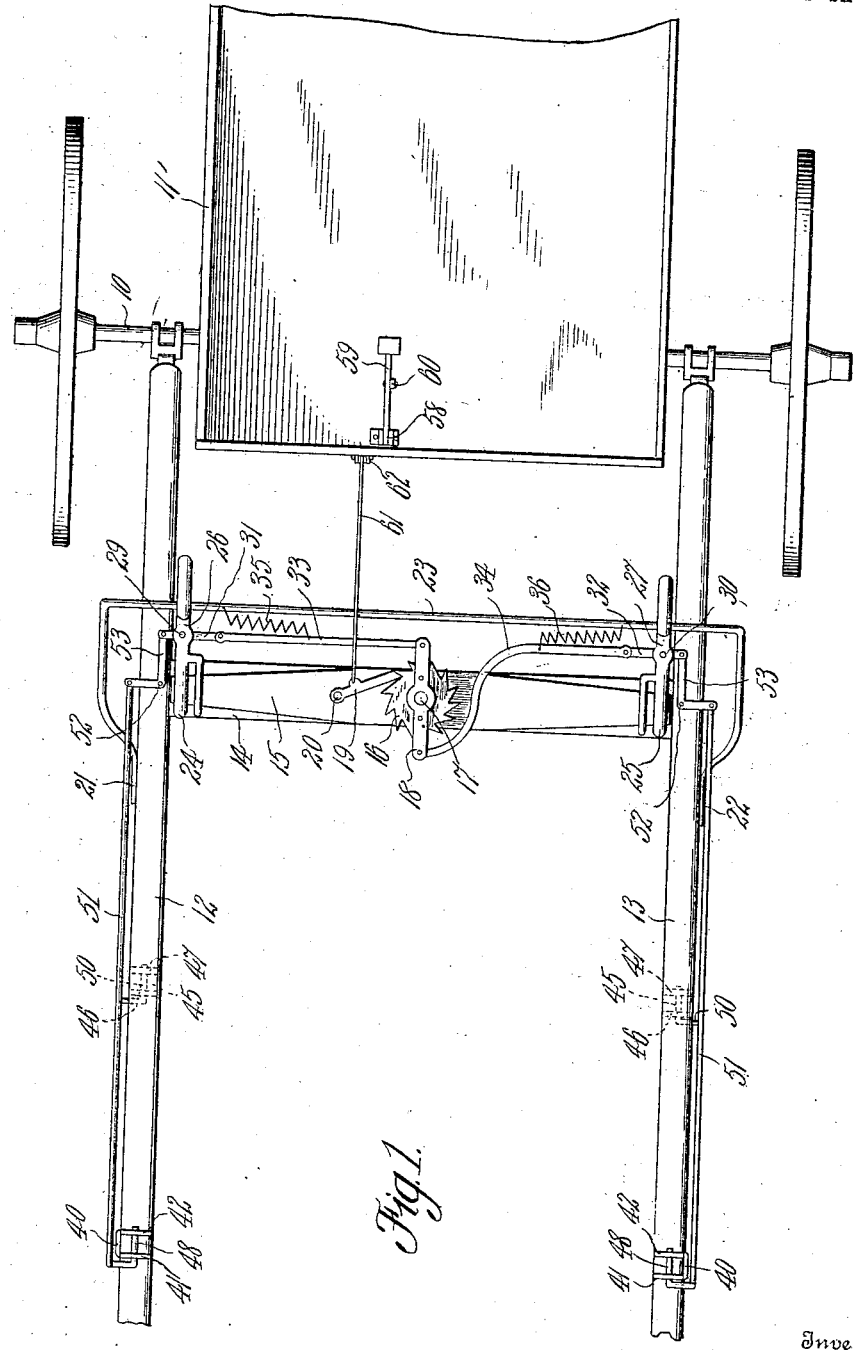

UNITED STATES PATENT OFFICE.

JESSE ALVA HOCKETT, OF AMO, INDIANA.

HORSE-RELEASER.

936,128.  Specification of Letters Patent.  Patented Oct. 5, 1909.

Application filed February 9, 1909. Serial No. 476,976.

*To all whom it may concern:*

Be it known that I, JESSE ALVA HOCKETT, a citizen of the United States, residing at Amo, in the county of Hendricks, State of Indiana, have invented certain new and useful Improvements in Horse-Releasers; and I do hereby declare the following to be a full, clear, and exact description of the invention, such as will enable others skilled in the art to which it appertains to make and use the same.

This invention relates to attachments to the thills of vehicles whereby the horse may be instantly released by the driver in event of its becoming unruly and attempting to run away, and has for one of its objects to improve the construction and increase the efficiency and utility of devices of this character.

Another object of the invention is to provide an efficient device of this character whereby the traces, hold-back straps and the girth portions of the harness may be simultaneously released from the whiffletree and the thills.

With these and other objects in view the invention consists in certain novel features of construction as hereafter shown and described and then specifically pointed out in the claims, and in the drawings illustrative of the preferred embodiment of the invention, Figure 1 is a plan view of the forward portion of a vehicle and the thills including the whiffletree, with the improvements applied. Fig. 2 is a side elevation of the same. Figs. 3, 4, 5 and 6 represent detail views enlarged, of various portions of the device.

The improved device may be applied to any of the usual forms of vehicles and the thills of the same, but for the purpose of illustration the device is shown applied to a conventional vehicle and its thills, the forward axle represented at 10, body portion at 11, the thills at 12—13 connected by the usual cross bar 14, and the whiffletree at 15, the thills coupled in the usual manner by clips to the axle.

The improved device embraces means for detaching the tugs or traces from the whiffletree, means for detaching the hold-back portion of the harness from the thills, and means for detaching the girth portions of the harness from the thills, the various operations of the device being simultaneously accomplished by the driver from his seat in the vehicle.

The portion of the device which is applied to the whiffletree 15 consists in a ratchet wheel 16, the wheel being mounted loosely upon the pin 17 upon which the whiffletree oscillates. Connected rigidly to the ratchet wheel 16 is a bar 18, while a pawl 19 is pivoted at 20 to the whiffletree and engages the teeth of the ratchet wheel, the object to be hereafter explained.

Connected at 21—22 to the outer faces of the thills 12—13 is a U-shaped rod 23, the rear portion of the rod extending transversely of the thills and above the same, as shown.

Slidably arranged over the free ends of the whiffletree 15 are the forked portions 24—25 of rods 26—27, the rear portions of the rods having longitudinal slots one of which is shown at 28 and bearing over the rod 23, the latter thus serving as a guide and support for the rods 26—27.

The traces or tugs are designed to fit over the terminals of the whiffletree and are held between the sides of the yoke members 24— 25, and so long as the yoke members are maintained in position upon the whiffletree, the traces will also be retained in position, as will be obvious.

Pivoted at 29—30 to the rods 26—27 are small swinging arms 31—32. The inner ends of the arms are connected by links 33— 34 to the opposite ends of the arm 18 of the ratchet wheel. Springs 35—36 are connected respectively between the stationary rod 23 and the movable links 33—34.

In coupling the traces to the whiffletree the pawl 19 is released manually and the bar 18 oscillated to cause the links 33—34 to move the rods 26—27 together with their yokes 24—25 outwardly free from the whiffletree, and after the traces are located upon the whiffletree and between the yokes, the bar 18 is forcibly operated to draw the rods 26—27 together with their yokes inwardly over the whiffletree and against the resistance of the springs 35—36, and the pawl 19 arranged to hold the ratchet wheel in its closed position, and thus retain the traces upon the whiffletree.

One feature of the improved device is to provide simply constructed attachments whereby the pull-backs, the girth and the saddle portions of the harness may be released simultaneously with the release of the traces. A portion of one of the hold-back straps is represented at 37, a portion of one of the saddle straps at 38, and a portion of the girth strap at 39 in Fig. 2. Connected to the thills 12—13 opposite the saddle and girth straps is a plate 40 having ears 41—42 extending upwardly therefrom and ears 43—44 extending downwardly therefrom, the two pair of ears being spaced a sufficient distance to receive the straps 38—39 between them.

Connected to the thills 12—13 opposite the points where the hold-back straps are to be connected are plates 45 having ears 46—47 similar to the ears of the plate 40 above noted. Slidably disposed through the ears 41—42 are pins 48, and slidably disposed through the ears 43—44 are pins 49, the pins 48 serving to couple the saddle straps 38 to the thills and the pins 49 serving to couple the girth straps to the thills, as represented in Fig. 2.

Slidably arranged through the ears 46—47 are pins 50 serving to couple the hold-backs 37 to the thills, as shown. Located in parallel relations to the thills 12—13 are rods 51, the rods coupled respectively to the pins 48—49—50 as shown, so that the longitudinal movement of the rods will withdraw the pins from the ears, as hereafter explained.

Pivoted at 52 to the thills are bell crank levers 53 connected at one end to the rod 51 and at their other ends to the members 31—32. By this means it will be obvious that when motion is imparted to the bar 18 to move the rods 26—27 relative to the whiffletree, the rods 51 together with their pins will be moved simultaneously therewith.

Mounted for rotation beneath the body 11 of the vehicle is a gear wheel 54, and swinging at 55 beneath the body is a lever arm 56 having a gear segment 57 engaging with the gear wheel 54. Mounted to swing at 58 from the body 11 is a foot lever 59 coupled by a link 60 to the lever arm 56. Connected at one end to the gear 54 and at the other end to the pawl 19 is a pull cord or cable 61, the pull cord being conducted preferably over a guide pulley 62. The foot lever 59 is provided with a suitable spring 63 to maintain it yieldably in its upward position, and thus maintains the segment 57 in proper relations to the gear 54.

By this simple arrangement it will be obvious that while the horse is proceeding under normal conditions, the connection between the harness and the vehicle will be maintained, but in event of the horse becoming unruly or attempting to run away, the driver can instantly release the horse entirely from all connection with the vehicle by simply pressing downwardly upon the foot lever 59, which will withdraw the pawl 19 from engagement with the ratchet wheel 16, thereby releasing the links 33—34 which will be instantly acted upon by the springs 35—36 and force the yoke members 24—25 outwardly in opposite directions, and thus throw the traces free from the whiffletree, and at the same time through the action of the bell cranks 53 and the rods 51 withdraw the pins and release the harness from all its connections with the thills.

The improved device is simple in construction, can be inexpensively manufactured, and applied to vehicles of various forms and sizes without material structural changes in the parts.

What is claimed, is:—

1. In a horse releaser the combination of a whiffletree, trace holding devices carried by said whiffletree, a ratchet wheel mounted for rotation, arms carried by said ratchet wheel, connecting means between said trace holding devices and said arms, springs operating upon said trace holding means and connecting means, a pawl engaging said ratchet wheel and operating to hold the ratchet wheel and springs normally in strained relations, and means under the control of the driver for releasing said pawl.

2. In a horse releaser the combination of a pair of thills and the cross bar thereof, a whiffletree mounted to swing upon said cross bar, trace holding devices each having a rearwardly directed slotted arm and carried by said whiffletree, a supporting rod connected to said thills and extending through said slotted arms, a ratchet wheel mounted for rotation, arms carried by said ratchet wheel, connecting means between said trace holding devices and said arms, springs operating upon said trace holding means and connecting means, a pawl engaging said ratchet wheel and operating to hold the ratchet wheel and springs normally in strained relations, and means under the control of the driver for releasing said pawl.

3. In a horse releaser the combination of a pair of thills and the cross bar thereof, a whiffletree mounted to swing upon said cross bar, trace holding devices each having a rearwardly directed slotted arm and carried by said whiffletree, a supporting rod connected to said thills and extending through said slotted arms, harness holding devices carried by said thills, a ratchet wheel mounted for rotation, arms carried by said ratchet wheel, connecting means between said trace holding devices and said arms, connecting means between said first mentioned connecting means and said harness holding devices, springs operating upon said trace holding means and connecting means, a pawl engaging said ratchet wheel and operating to hold the ratchet wheel and springs normally in strained relations, and means under the control of the driver for releasing said pawl.

In testimony whereof, I affix my signature, in presence of two witnesses.

JESSE ALVA HOCKETT.

Witnesses:
ANN B. THOMPSON,
JOHN T. THOMPSON.